United States Patent [19]

Sander

[11] Patent Number: 4,936,954
[45] Date of Patent: Jun. 26, 1990

[54] APPARATUS FOR SEPARATING LIQUID MIXTURES BY PERVAPORATION

[75] Inventor: Ulrich Sander, Friedrichsdorf, Fed. Rep. of Germany

[73] Assignee: Metallgesellschaft AG, Frankfurt am Main, Fed. Rep. of Germany

[21] Appl. No.: 238,991

[22] Filed: Aug. 29, 1988

Related U.S. Application Data

[63] Continuation of Ser. No. 28,479, Mar. 20, 1987, abandoned, which is a continuation-in-part of Ser. No. 795,618, Nov. 6, 1985, abandoned.

[30] Foreign Application Priority Data

Nov. 10, 1984 [DE] Fed. Rep. of Germany ....... 3441190

[51] Int. Cl.$^5$ .............................................. B01D 13/00
[52] U.S. Cl. .................................... 202/172; 159/28.6; 159/46; 159/DIG. 27; 159/DIG. 42; 202/176; 202/186; 202/269; 210/321.64; 210/321.84
[58] Field of Search ................ 202/205, 172, 173, 176, 202/202, 186, 369; 203/87, 99; 159/28.6, DIG. 28, DIG. 42, DIG. 27, 46, 18, 17.2, 20.2, DIG. 8, DIG. 16; 210/321.64, 321.84

[56] References Cited

U.S. PATENT DOCUMENTS

| | | |
|---|---|---|
| 3,201,332 | 8/1965 | Wennerberg ....................... 159/28.6 |
| 3,398,091 | 8/1968 | Greatorex ............................ 159/28.6 |
| 3,520,803 | 7/1970 | Iaconelli ........................... 210/321.64 |
| 3,563,860 | 2/1971 | Hederycky ........................... 202/172 |
| 3,735,793 | 5/1973 | Burberry et al. ................... 159/28.6 |
| 3,768,539 | 10/1973 | Chamberlin et al. .............. 159/28.6 |
| 3,984,281 | 10/1976 | Buchwald ............................ 159/28.6 |
| 4,165,082 | 8/1979 | Foucras et al. ................. 210/321.84 |
| 4,340,475 | 7/1982 | Kraus et al. ..................... 210/321.84 |
| 4,347,897 | 9/1982 | Sumitomo et al. ................. 159/28.6 |
| 4,391,676 | 7/1983 | Torberger ........................... 202/235 |
| 4,405,409 | 9/1983 | Tusel et al. ........................ 202/235 |
| 4,545,862 | 10/1985 | Gore et al. ......................... 202/172 |
| 4,572,766 | 2/1986 | Dimitriou ........................... 159/28.6 |

FOREIGN PATENT DOCUMENTS

| | | | |
|---|---|---|---|
| 2902247 | 4/1981 | Fed. Rep. of Germany ..... | 159/28.6 |
| 3219869 | 12/1983 | Fed. Rep. of Germany ..... | 159/28.6 |
| 3303910 | 8/1984 | Fed. Rep. of Germany ..... | 159/28.6 |
| 1268397 | 3/1972 | United Kingdom ........... | 210/321.84 |

Primary Examiner—Virginia Manoharan
Attorney, Agent, or Firm—Herbert Dubno; Andrew Wilford

[57] ABSTRACT

A liquid mixture is separated by pervaporation in an apparatus formed by a unitary stack of upright rectangular plates, diaphragms, and seals held together by tie rods. Each of the plates is formed with two upper and two lower corners formed with respective holes and each plate is formed inward of the respective holes with a corrugated central portion and the holes of the plates are aligned horizontally. Each diaphragm is sandwiched between two plates to form a cell having a pair of compartments separated by the respective diaphragm. The seals are arranged in the upstream region of the stack such that the liquid mixture enters one of the lower holes, passes downstream along the upstream portion into one of the compartments of each cell, and its lighter fraction passes as vapor through the diaphragms into the other compartments of these cells while its heavier fraction passes back upstream and exits the apparatus from one of the upper holes. The lighter fraction moves downstream in the stack through one compartment of each of the downstream cells while a coolant is circulated through the other compartments of these downstream cells so this lighter fraction is condensed and exits the apparatus through one of the lower holes.

4 Claims, 4 Drawing Sheets

APPARATUS FOR SEPARATING LIQUID MIXTURES BY PERVAPORATION

CROSS REFERENCE TO RELATED APPLICATION

This application is a continuation of now abandoned application Ser. No. 07/028,479 itself filed 20 Mar. 1987 as a continuation-in-part of then copending but since abandoned patent application Ser. No. 06/795,618 filed 06 Nov. 1985.

FIELD OF THE INVENTION

My present invention relates to an apparatus for separating liquid mixtures by pervaporation, and, more particularly, the separation of liquids based in part upon relative rates of diffusion through a permeable layer and evaporation on a surface thereof.

BACKGROUND OF THE INVENTION

An apparatus for the pervaporation separation of liquid mixtures can comprise a plurality of platelike components, which are assembled to form a structure that is similar to a filter stack in a filter press or a plate heat exchanger provided with individual cells. Each pervaporator cell can comprises a raw fluid compartment and a permeate compartment, which are separated by a vapor-permeable diaphragm.

For pervaporation, liquid mixtures are supplied to a diaphragm which has a much higher permeability for one or more components of the mixture than for the other components. One component which has a higher solubility and a higher diffusibility in the diaphragm matrix constitutes a permeate, which migrates or diffuses through the diaphragm from one side and can be withdrawn from its opposite side as vapor. A component having a lower solubility and diffusibility is retained as a retentate.

The separations which can thus be effected cannot be achieved at all or only at much higher cost by other methods. For instance, it has been proposed in U.S. Pat. No. 4,405,409 to remove water from mixtures of organic liquids and water by first reducing the water content by distillation and subsequently decreasing the water content further by pervaporation.

The separating effect of diaphragms used for pervaporation has long been known, but has not been used industrially on a substantial scale.

This has been due, inter alia, to the fact that each apparatus developed for pervaporation has been too expensive and/or has not been sufficiently reliable in operation.

Pervaporators comprising coiled structures are known in addition to the pervaporators described previously (see German Patent Publication DE-AS No. 29 02 247, Published German Application DE-OS No. 32 19 869 and Published German Application DE-OS No. 33 03 910).

The basic flat-plate design is similar to that of filter presses and plate heat exchangers. Substantially similar platelike components are joined in a pack or stack, in which all required connecting passages have been integrated by the provision of suitable bores and seals.

As far as I know, the known apparatus of this type has not been used on an industrial scale.

Plastic or synthetic resin structures may involve the problem that the platelike components cannot be made with the required small tolerances in relatively large sizes and that the material does not have an adequate creep strength and tends to flow under the high external pressures which are exerted by the tie rods and are required to ensure an adequate seal.

Metal structures have not been used before, probably because their manufacture is too expensive or because they lack an adequate resistance to corrosion. Besides, they cannot readily be adapted to different functions so that an integration as is provided in the apparatus described first hereinbefore is difficult.

OBJECTS OF THE INVENTION

It is the principal object of the invention to provide an improved pervaporator or pervaporation liquid-separation apparatus which avoids the drawbacks enumerated above.

It is also an object of my invention so to improve an apparatus which is of the kind described first hereinbefore that the pervaporation can be made more reliable and can be carried out on an industrial scale.

Specifically, it is desired to provide an apparatus which can be made economically and which is versatile so that it can easily be altered or adapted for different uses.

Yet another object of this invention is to provide an apparatus which extends the principles of my above-mentioned copending application.

SUMMARY OF THE INVENTION

This object is accomplished with an apparatus which serves to separate liquid mixtures by pervaporation comprising a plurality of platelike components assembled in mutually parallel stacked relationship in a pack which has a plurality of pervaporator cells, each having a raw fluid compartment and a permeate compartment separated by a vapor permeable diaphragm.

According to the invention 2 to 300 pervaporator cells are connected in parallel in each module, a condenser of the same type as the module, i.e. a parallel-plate condenser, is associated with the pervaporator module, and the module and the condenser are connected by means of cover plates and tie rods in a unit with suitable sealing elements interposed and with connecting inlet and outlet passages formed at the edges.

The plate-condenser part of the stack can have 1 to 200 cooling chambers connected in parallel and 1 to 200 condensing chambers connected in parallel. A number of such pervaporator modules can be combined in a unit with each condenser and the unit can form an assembly with a recuperator and one or more heaters. All of the walls which define the chambers can be composed of commercially available standard plates.

The condenser can be provided at its bottom with an outlet followed by a pipe riser rising approximately to a top edge of the plates and connected at its top by a pipe bend to a downcomer which is cooled. A connection for a vacuum pump is provided at the top pipe bend and the lower end of the downcomer is provided with a connection to a condensate pump, preferably on the same level as the stack.

The apparatus in accordance with the invention constitutes a compact unit, which comprises the essential means required for pervaporation and which can be handled and transported as a unit and can be made ready for operation within a short time without a need for a high assembling expenditure at any desired location. The unit is highly versatile because it can easily be altered in adoption for possible uses by a change of the number of pervaporator cells and the number of chambers provided in the condenser. Specifically, the unit can be made in a highly economical process from standardized, commercially available plates.

More specifically, the plates which are assembled in stacks, according to the invention, can be of rectangular form and can have notches along the outer perimeters of the plates, preferably at offset narrow ends thereof, to accommodate tie rods drawing the plates against one another.

The plates, which can be identical and hence mass-produced, can have close to the corners thereof, holes which ultimately will serve to communicate fluid to and receive fluid from corrugated center portions of the plates.

As will be described below, an important aspect to the invention is that the fluid flow through the corrugated passages of each plate is effected from one of the holes along one longitudinal edge at one end of each plate to the hole along the same longitudinal edge at the opposite end of each plate and to confine the fluid flow so that for each plate in the stack, the proper holes are involved in the flow through the corrugations of the plates, the perimeter of the plates and the perimeters of each hole are formed with a pair of ridges defining a seat for a sealing strip which is lodged between the pair of ridges of the plate and abuts an adjoining plate. The pattern of flow is thus determined by the layout of the seals in the places between the ridges of each pair. By alternating this layout for otherwise identical plates, the flow pattern can be altered without requiring plates of different construction.

BRIEF DESCRIPTION OF THE DRAWING

The above and other objects, features and advantages will become more readily apparent from the following description, reference being made to the accompanying highly diagrammatic drawing in which.

SPECIFIC DESCRIPTION

The unit shown in FIG. 1 comprises platelike components 1 to 7 having a design which is basically known for filter presses or plate heat exchangers and is described below in greater detail.

As a rule, two juxtaposed plates and interposed seals define an enclosed chamber, which is provided at its edges with connecting passages for supply and withdrawal of liquid or gaseous fluids.

In heat exchangers, alternate chambers are supplied with heat-absorbing and heat-delivering fluids and the plate which separates the chambers constitutes a heat transfer surface.

In pervaporators, the chamber defined by two plates is divided by a diaphragm. One compartment of the chamber contains the raw mixture or the more or less enriched retentate. The other compartment of the chamber contains the permeate in the form of a vapor. The fluid streams are also supplied and withdrawn through the connecting passages, which are provided at the edges.

Figure 1:
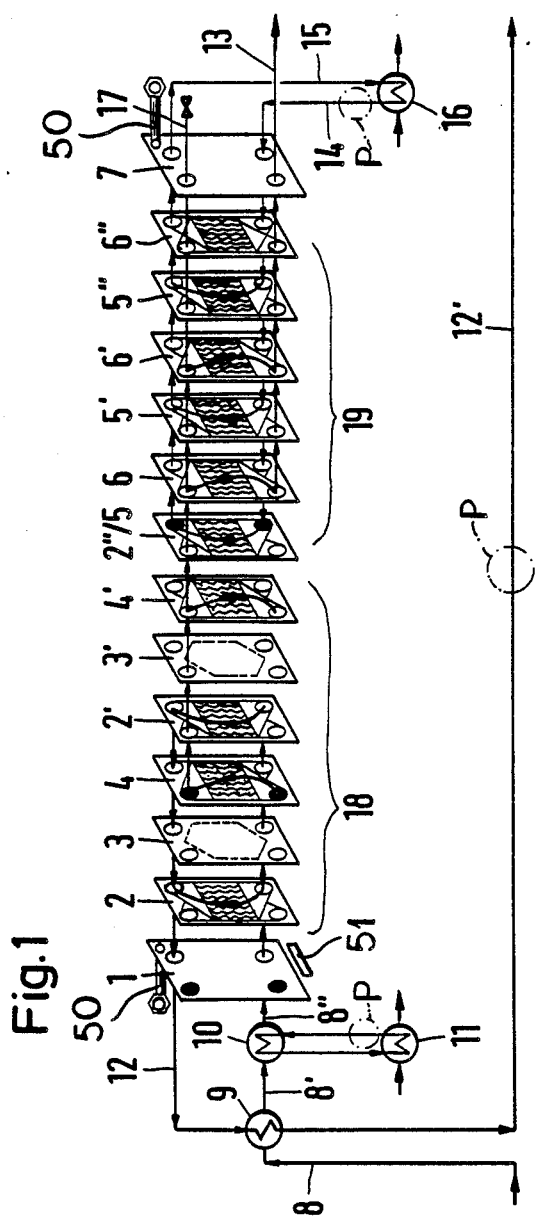
FIG. 1 is an exploded view showing a unit, in part schematically, in accordance with the invention.

FIG. 1 shows cover plates 1 and 7 provided at the ends of the unit. In the assembled unit, the plates 2 to 6 are clamped together by means of tie rods 50, and with suitable seals (represented at 51) interposed.

As a result, the unit is absolutely tightly sealed toward the outside and is provided with internal passage systems for conducting the different fluids. These passage systems are reliably sealed from each other.

In accordance with FIG. 1, the plate 2 and the diaphragm 3 define a compartment for raw fluid and the diaphragm 3 and the plate 2' define a permeate compartment. The plate 4 is perforated in its effective area and in the present case does not constitute a partition but serves only to support the diaphragm 3.

The plate 2' constitutes also the first confining wall for the next pervaporator cell, which includes the diaphragm 3', the supporting plate 4' and the plate 2''/5.

It will readily be understood that in dependence on the intended use of the pervaporator, any desired number of the sets of components 2, 3, 4 can be assembled to form a module 18.

The plate 2''/5 constitutes the last wall 2'' of the pervaporator 18 and the first wall 5 of the condenser 19, in which cooling chambers (defined by 5 and 6, 5' and 6') and condensing chambers (between 6 and 5', 6' and 5'') are arranged in alteration. The first coolant chamber (defined by the plate 6) is thus separated by the first plate of the condenser and the last plate of the pervaporated 2''/5 from the last permeate chamber. It will be understood that the condenser may comprise more chambers than are shown in FIG. 1.

A raw liquid mixture to be separated into its components is supplied through a line 8, 8', 8'' to the unit shown in FIG. 1. The raw mixture has previously been heated to the required temperature in a recuperator 9 by the effluent conducted in line 12 and by means of a closed heating circuit 10, 11. Thereafter the raw mixture is supplied through a connecting passage to the raw fluid compartments (between 2 and 3 and between 2' and 3'), which are connected in parallel and from which the permeate permeates the diaphragms 3, 3' to enter the permeate compartments (between 3 and 2' and between 3' and 2''/5). Through a second connecting passage the retentate consisting of the product or enriched mixture is withdrawn from the raw fluid compartment and finally delivered via line 12. The permeate flows through a third connecting passage into the condenser 19.

The condenser 19 is flown through by a cooling fluid, which is conducted in a closed circuit (lines 14, 15) through a recooler 16. Three cooling chambers (between 5 and 6, between 5' and 6' and between 5'' and 6″), which are connected in parallel, are shown in FIG. 1. They are, arranged in alternation with an equal number of condensing chambers, which are defined by the plates 6 and 5′; 6′ and 5″; and 6″ and 7, respectively.

The condensed product is withdrawn through line 13. Noncondensible constituents are withdrawn by means of a vacuum pump through line 17 in order to maintain a negative pressure in the condensing chambers. The product or an enriched mixture leaves the unit through the line 12′ after having been cooled by fresh raw mixture in the recuperator 9.

Figure 2:
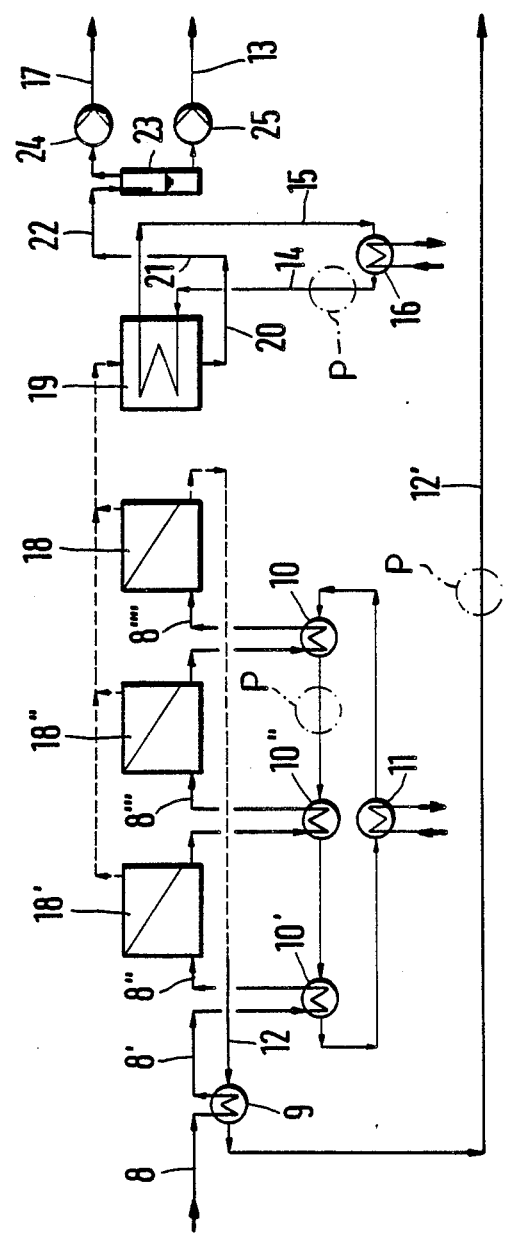
FIG. 2 is a flow diagram of an apparatus in accordance with the invention, including a plurality of modules.

FIG. 2 is a flow scheme for a plurality of modules. In dependence on the intended use, the modules 18′ and 18″ may precede the unit consisting of the module 18 and the condenser 19 or may be combined with the unit 18 and 19 to form a larger unit.

The raw mixture is supplied through lines 8, 8′ and 8″ and is heated in the recuperator 9 and in the heat exchanger 10, enriched in a first stage in the module 18, reheated in the heat exchanger 10, enriched in a first stage in the module 18, reheated in the heat exchanger 10′, supplied via line 8″′ to module 18′ and further enriched therein, and when it has been reheated in the heat exchanger 10″ flows through the line 8″″ to the module 18″ and is finally enriched therein.

The product leaves the apparatus through lines 12 and 12′ and is cooled with fresh raw mixtures in the recuperator 9. The heat exchangers 10 and 10′ are connected in a closed circuit and the heat transfer fluid used therein is reheated in the heat exchanger 11.

The coolant for the condenser 19 is also conducted in a closed cycle (lines 14, 15). The heat transfer fluid is circulated through and recooled in the cooler 16.

While throughout convective flow may be used in the closed circulations, pumps P may be used as shown in dot-dash lines.

The outlet 20 at the bottom of the condenser is succeeded by a rising pipe 21, a pipe bend 22 at the top of the pipe 21, and a cooled downcomer 23. Such an arrangement will be desirable if it is difficult to arrange the intake line for the condensate pump below the condenser, as is otherwise usual. In the present case, the condensate pump 25 may be arranged on the same level as the apparatus itself.

It will be understood that it must be examined whether the structural advantages will more than offset the inevitable decrease of the vacuum which is generated by the vacuum pump 24. But that disadvantage involved in the proposed arrangement may be offset by other advantages, for instance, if an additional "degassing line" is required for an improved removal of the noncondensible constituents, to be withdrawn through line 17, from the condensate to be withdrawn through line 13.

FIGS. 3–7 show the plates which can be used in accordance with this invention in greater detail.

The plates, here designated generally at 40, can be seen to be of rectangular configuration with rounded corners 41, at each of which a hole 29–32 is provided.

Midway between the holes at each narrow end, a notch 33 is formed in a plate to accommodate a tie rod 42 (see also FIG. 7), the tie rods tying the plates together in a stack, as has been described in connection with FIG. 1.

Figure 5:
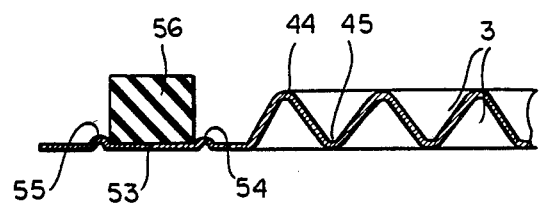
FIG. 5 is a section taken along the line V—V of FIG. 4.
Figure 7:
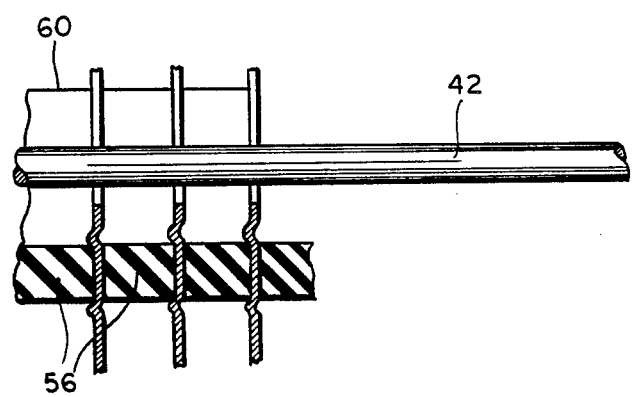
FIG. 7 is a section generally along the line VII—VII of FIG. 4.

Centrally of the plate is a corrugated region 43 with each corrugation running in a zigzag pattern longitudinally of the plate and with crests 44 alternating with troughs 45 transversely across the plate (FIG. 5).

The central region is located between the ends 46 of a pair of crossing inclined tracks 47 at each end of the plate. The tracks 47 are each formed by a pair of ridges 48, 49, shown by simple lines, the ridges of each track terminating at a circular pair of ridges 50, 51 bounding each of the holes 29–32.

Along the longitudinal edges and flanking the corrugated region 43 are similar tracks 52 and 53 defined between the longitudinal ridges 54 and 55 which have been shown in cross section in FIG. 5. These ridges are relatively shallow and demarcate the respective tracks into which a sealing strip 56 can be laid and bonded by an adhesive.

Figure 6:
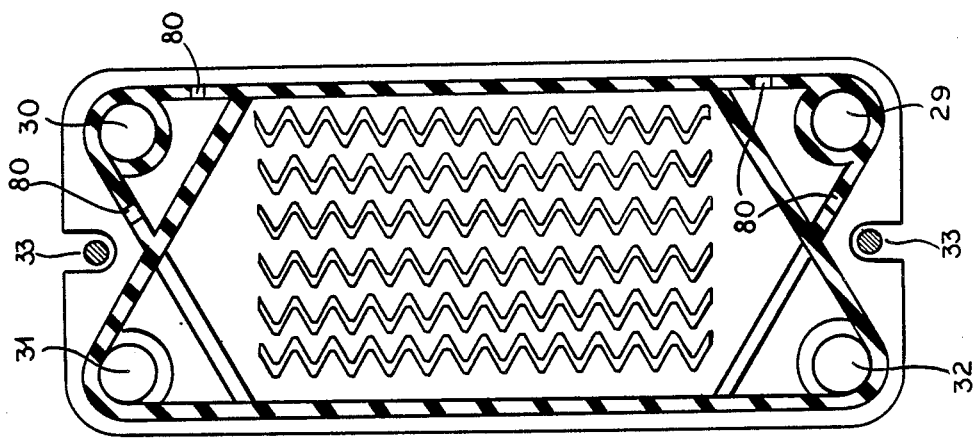
FIG. 6 is a view similar to FIG. 4 showing the arrangement of the sealing strips when the flow is between the holes along the left-hand longitudinal edge of the plate which otherwise is identical to that of FIG. 3.
Figure 4:
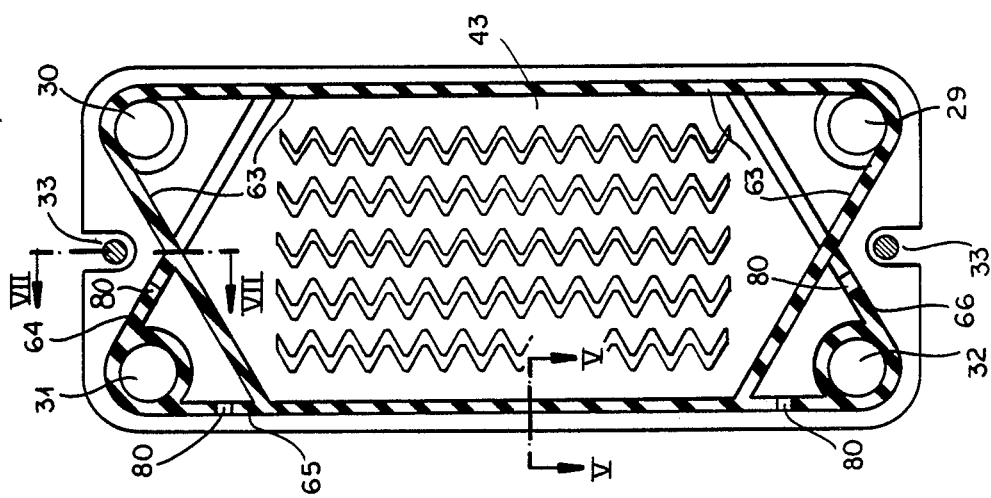
FIG. 4 is a view similar to FIG. 3 of a plate in which the flow is between holes along the right-hand longitudinal edge of the plate which otherwise is identical to the plate of FIG. 3, the flow pattern being selected by the layout of sealing strips.
Figure 3:
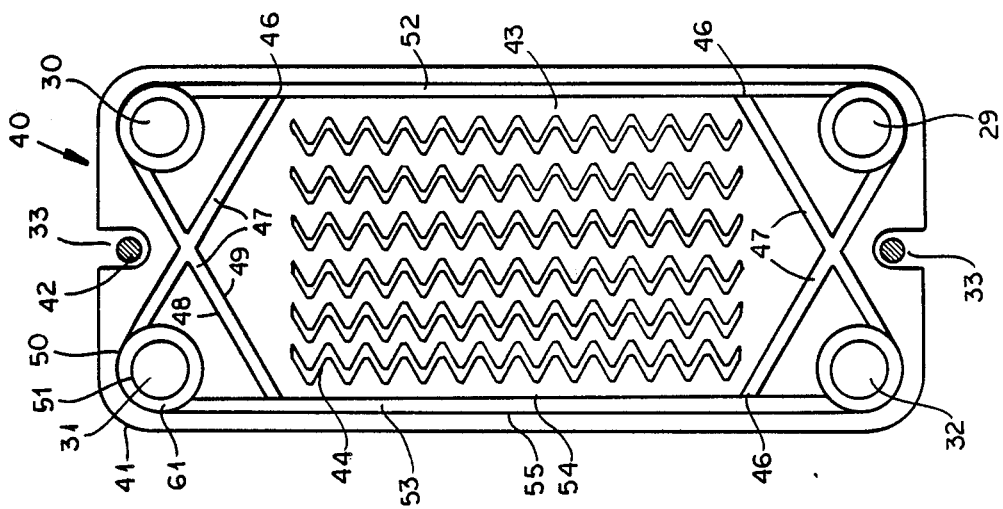
FIG. 3 is an elevational view of a plate without any sealing strips to show the symmetrical construction thereof.

Typically sealing strip patterns are shown in FIGS. 4 and 6.

For holes, e.g. the holes 31 and 32 in FIG. 4 and the holes 29 and 30 in FIG. 6, which are merely to conduct fluid through the plate perpendicular thereto, rather than along the plate, collars 60 of sealing strip can be laid into the circular tracks 61 defined between the ridges 50 and 51.

Otherwise the sealing strips are laid into the tracks to define a flow pattern along the plates. In the arrangement of FIG. 4, for example, a single sealing strip 63 can extend along a track 47 around the hole 30, along the right-hand longitudinal edge of the plate and along the inclined track extending upwardly after passing around the hole 29.

Further sealing strips 64, 65 and 66 can extend to the collars around the holes 31 and 32 in FIG. 4 and a sealing strip 67 can run along the left-hand longitudinal edge of the plate. Holes 80 can be provided to prevent trapping fluid where there is no flow. With the arrangement shown in FIG. 4, fluid from hole 29 will be distributed to the corrugations of the region 43 in FIG. 4 and pass upwardly to be collected by the hole 30.

An opposite organization of the seal is shown in FIG. 6 where the fluid flow is between the holes 31 and 32 through the corrugations.

Successive plates can abut the seals directly (FIG. 7) or, as the need may arise, seal-carrying faces of the plates may confront one another so that the compartments between the plates are sealed by seal-to-seal engagement in a double-seal arrangement.

Thus simple commercially available plates can be used in a highly versatile way in accordance with the invention for the pervaporation apparatus.

As has been explained hereinbefore, a main reason why pervaporation has not been used in industry in spite of the advantages afforded by that process for some liquid separation problems resides in that it has not been possible before to provide equipment which is satisfactory from technological and economic aspects. It has surprisingly been found, however, that the apparatus in accordance with the invention overcomes all problems relating to sealing and corrosion and that such apparatus can be made with an expenditure which is well justified from an economic aspect. The use of commercially available plates which have been developed, e.g., for plate heat exchangers, is particularly favorable because they are available in a large number of sizes and materials and because they definitely constitute a mass-produced article, which is manufactured in a thoroughly rationalized process so that it is available at very low cost.

Initial doubts that the proposed design might not be suitable for a condenser because it requires a large surface area and involves excessively high pressure losses have not been confirmed. In most cases the cooling surface areas required for the condensation of the permeate are much smaller than the diaphragm surface areas required for the corresponding separations so that overall units with reasonable dimensions can be provided and are highly suitable for a manufacture in large quantities. It need not be emphasized that such apparatus can be altered in a simple manner in adaptation for tasks and can be combined in various ways with other equipment (see FIG. 2). It will also be understood that recuperators or means for preheating or reheating may also be composed of plates and may be integrated in the unit.

In most processes of separating liquid mixtures by pervaporation, it is more economical, however, to use heat exchangers which are not integrated because integrated heat exchangers will involve inadequate velocities of flow and correspondingly low heat transfer rates.

I claim:

1. An apparatus for separating a liquid mixture by pervaporation, the apparatus comprising:
    a unitary stack of upright rectangular plates, diaphragms, and seals held together by tie rods, each of the plates being formed with two upper and two lower corners formed with respective holes, each plate being further formed inward of the respective holes with a corrugated central portion, the holes of each plate being aligned horizontally with the respective holes of the other plates;
    the plates and diaphragms of an upstream portion of the stack forming a multiplicity of pervaporator cells each formed between a respective pair of the plates sandwiching a respective one of diaphragms and each forming between one of the plates of the respective pair and the respective diaphragm a retentate compartment and between the other plate of the pair and the respective diaphragm a permeate compartment, whereby a plurality of retentate compartments and a plurality of permeate compartments are formed;
    the seals being arranged in the pervaporator cells such that
        one of the lower holes of each of the plates of the pervaporator cells forms a lower retentate passage opening into each of the permeate compartments,
        one of the upper holes of each of the plates of the pervaporator cells forms an upper retentate passage opening into each of the retentate compartments, and
        the other upper holes of each of the plates of the pervaporator cells form an upper vapor passage opening into the permeate compartments;
    means for supplying the liquid mixture through the lower retentate passages into the retentate compartments;
    means for withdrawing the liquid as retentate from the upper retentate passage and therethrough from the retentate compartments, whereby a permeate in the liquid passes through the diaphragms from the retentate compartments to the permeate compartments;
    the plates and diaphragms of a downstream portion of the stack forming a condenser comprised of alternating condensing and cooling chambers formed by respective sides of pairs of the plates, the seals being arranged in the condenser such that
        one of the lower holes of each of the plates of the condenser forms a lower coolant passage,
        one of the upper holes of each of the plates of the condenser forms an upper coolant passage,
        the other lower holes of the plates of the condenser form a lower condensate passage, and
        the upper vapor passage opens into the condenser chamber closest to the pervaporator cells;
    means for feeding a coolant to the lower coolant passage and therethrough into the cooling chambers and for withdrawing the coolant from the upper coolant passage and therethrough from the cooling chambers, whereby the permeate vapor is condensed in the condensing chambers; and
    means for withdrawing the permeate from the lower passage.

2. The apparatus defined in claim 1 wherein each of the plates has a pair of faces and is formed thereon with a network of tracks defining grooves running around the periphery of the plates and around the holes of the plates, the seals lying in the grooves.

3. The apparatus defined in claim 1, further comprising
    means for heating the liquid mixture prior to supplying same to the lower retentate passage.

4. The apparatus defined in claim 3 wherein the heating means is a recuperator traversed and heated by the liquid withdrawn from the upper retentate passage.

* * * * *